United States Patent
Matsumura et al.

(10) Patent No.: US 10,770,710 B2
(45) Date of Patent: Sep. 8, 2020

(54) CONNECTION MODULE FOR A POWER STORAGE ELEMENT GROUP

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi-ken (JP)

(72) Inventors: Nobuyuki Matsumura, Mie (JP); Shinichi Takase, Mie (JP); Yusuke Suzuki, Aichi (JP); Atsushi Yamanaka, Aichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 127 days.

(21) Appl. No.: 16/083,180

(22) PCT Filed: Mar. 10, 2017

(86) PCT No.: PCT/JP2017/009656
§ 371 (c)(1),
(2) Date: Sep. 7, 2018

(87) PCT Pub. No.: WO2017/155078
PCT Pub. Date: Sep. 14, 2017

(65) Prior Publication Data
US 2019/0103595 A1    Apr. 4, 2019

(30) Foreign Application Priority Data
Mar. 10, 2016 (JP) .................................. 2016-046936

(51) Int. Cl.
*H01M 2/10*    (2006.01)
*H01M 2/26*    (2006.01)
(Continued)

(52) U.S. Cl.
CPC ................ *H01M 2/26* (2013.01); *H01G 2/02* (2013.01); *H01G 2/04* (2013.01); *H01G 11/10* (2013.01);
(Continued)

(58) Field of Classification Search
CPC ...... H01M 2/26; H01M 2/206; H01M 2/1077; H01M 2220/20; H01G 2/04; H01G 11/76; H01G 2/02; H01G 11/10
(Continued)

(56) References Cited

U.S. PATENT DOCUMENTS 9,748,540 B2    8/2017  Ikeda et al.
2008/0068801 A1*  3/2008  Wilk ........................ H01G 2/04
                                                    361/702

(Continued)

FOREIGN PATENT DOCUMENTS

JP    2013-037777    2/2013
JP    2013-069491    4/2013
(Continued)

OTHER PUBLICATIONS

International Search Report PCT Patent Application No. PCT/JP2017/009656, dated Jun. 6, 2017, along with an english translation thereof.

*Primary Examiner* — Gary D Harris
(74) *Attorney, Agent, or Firm* — Greenblum & Bernstein, P.L.C.

(57) ABSTRACT

A connection module includes bus bars connecting positive and negative electrode terminals of adjacent power storage elements, a first sheet member that is expandable, and (Continued)

second sheet members fixing each of the bus bars independently. Each of the bus bars includes a fitting portion extending from one edge of the plate member with respect to a width direction (an arrow Y-direction) and fitting in a fixing portion of each second sheet member. The first sheet member holds each second sheet member to which each of the bus bars is fixed, and the first sheet member is expandable at sections between adjacent second sheet members in a longitudinal direction of the first sheet member in a distance of a maximum value of tolerance $\Delta L$ max that is a total value of tolerances of an electrode pitch with respect to an arrangement direction in which the adjacent power storage elements are arranged.

7 Claims, 9 Drawing Sheets

(51) Int. Cl.
| | |
|---|---|
| *H01G 11/10* | (2013.01) |
| *H01G 2/04* | (2006.01) |
| *H01G 2/02* | (2006.01) |
| *H01G 11/76* | (2013.01) |
| *H01M 2/20* | (2006.01) |

(52) U.S. Cl.
CPC .......... *H01G 11/76* (2013.01); *H01M 2/1077* (2013.01); *H01M 2/206* (2013.01); *H01M 2220/20* (2013.01)

(58) Field of Classification Search
USPC .......................................................... 429/178
See application file for complete search history.

(56) References Cited

U.S. PATENT DOCUMENTS

| | | |
|---|---|---|
| 2012/0328920 A1 | 12/2012 | Takase et al. |
| 2013/0236761 A1* | 9/2013 | Seong ................ H01M 2/1077 429/99 |
| 2016/0240280 A1 | 8/2016 | Dressel et al. |

FOREIGN PATENT DOCUMENTS

| | | |
|---|---|---|
| JP | 2014-175291 | 9/2014 |
| WO | WO2011/0111678 | 9/2011 |
| WO | WO2015/0062944 | 5/2015 |

\* cited by examiner

CONNECTION MODULE FOR A POWER STORAGE ELEMENT GROUP

TECHNICAL FIELD

The present technology relates to a connection module, specifically, to a connection module used in a power storage module.

BACKGROUND ART

A power storage module for vehicles such as electric vehicles or hybrid vehicles includes multiple power storage elements having positive electrode terminals and negative electrode terminals. The power storage elements are arranged such that electrode terminals of adjacent power storage elements are connected with a bus bar and the power storage elements are connected in series or in parallel.

In the power storage module, there has been known a technology that each bus bar is held with an insulation film sheet included in the connection module (for example, refer Patent Document 1) for easy operation of mounting each bus bar on the electrode terminals.

[Patent Document 1] Japanese Unexamined Patent Application Publication No. 2014-175291

The bus bar module (the connection module) described in Patent Document 1 includes an insulation film sheet (hereinafter, referred to as a sheet member) that is made of expandable synthetic resin. If an interval between the electrodes of adjacent power storage elements (an electrode pitch) is varied, the sheet member made of expandable synthetic resin may follow the variation of the interval. However, each of the bus bars that are bonded on the sheet member may be moved independently if the sheet member, which is expandable and soft, is expanded or contracted. Therefore, the movement of each bus bar cannot be assumed. It is necessary to control positions of the bus bars to follow a tolerance of the electrode pitch of the power storage module. However, the positions of the bus bars cannot be controlled and therefore, the connection module including the sheet member may not be properly mounted in a power storage element group.

In the connection module described in Patent Document 1, the connection module is mounted in the power storage element group such that the electrode (a bolt) of a battery is tightened up with the sheet member and the nut. Therefore, a tightening force of the sheet member is decreased due to lowering of reaction force of the sheet member after the tightening, and the bolt may loosen by vibration. If the bolt loosens, the reliability of mounting of the connection module on the power storage element group may be lowered.

In this specification, there is provided a connection module that can follow a tolerance of an electrode pitch in an arrangement direction of power storage elements of a power storage element group and keep reliability of mounting of the connection module on the power storage element group with a simple structure.

SUMMARY

A connection module described in this specification is to be mounted on a power storage element group including power storage elements having a positive electrode terminal and a negative electrode terminal. The connection module includes bus bars each including a plate member that connects the positive electrode terminal and the negative electrode terminal of adjacent power storage elements among the power storage elements, a first sheet member that is expandable and includes an adhesive member on a surface thereof, and second sheet members disposed on the first sheet member at intervals and formed of a hard insulation member that is not expandable, each of the second sheet members having a fixing portion that fixes each of the bus bars independently. Each of the bus bars includes a fitting portion that extends from one edge of the plate member with respect to a width direction thereof and fits in the fixing portion of each second sheet member. The first sheet member holds each of the second sheet members with the adhesive member, and each of the bus bars is fixed to each second sheet member and accordingly, the first sheet member commonly holds the bus bars. The first sheet member is formed of a flexible insulation member such that the flexible insulation member is expandable at sections between adjacent second sheet members in a longitudinal direction of the first sheet member, and the flexible insulation member is expandable at least in a distance of a maximum value of tolerance that is a total value of tolerances of an electrode pitch with respect to an arrangement direction in which the adjacent power storage elements are arranged.

According to such a configuration, the second sheet members that fix and hold the bus bars are disposed on the first sheet member and the first sheet member is formed of a flexible insulation member so as to be expandable in the sections thereof between the adjacent second sheet members in the longitudinal direction of the first sheet member and the flexible insulation member is expandable at least in the distance of the maximum value of the tolerance that is the total value of the tolerances of the electrode pitch with respect to the arrangement direction of the adjacent power storage elements. Therefore, the connection module can be mounted on the power storage element group while following the electrode pitch tolerance of the power storage electrode group and the mounting operation can be easy.

The fitting portions of the bus bar project from one edge of the plate member with respect to the width direction thereof and are fit in the fixing portion of the second sheet member. Therefore, the electrode (bolt) of the power storage element is not tightened with a nut by the sheet member in mounting the connection module on the power storage element group. Thus, reliability of mounting of the connection module on the power storage element group can be maintained. Namely, according to this configuration, the connection module can be mounted while following the tolerance of the electrode pitch in the arrangement direction of the power storage elements of the power storage element group with a simple structure.

The connection module of the present technology can follow a tolerance of an electrode pitch in an arrangement direction of power storage elements of a power storage element group and keeps reliability of mounting on the power storage element group with a simple structure.

MODE FOR CARRYING OUT THE INVENTION

Embodiment

One embodiment according to a present invention will be described with reference to FIGS. 1 to 9.

Figure 1:
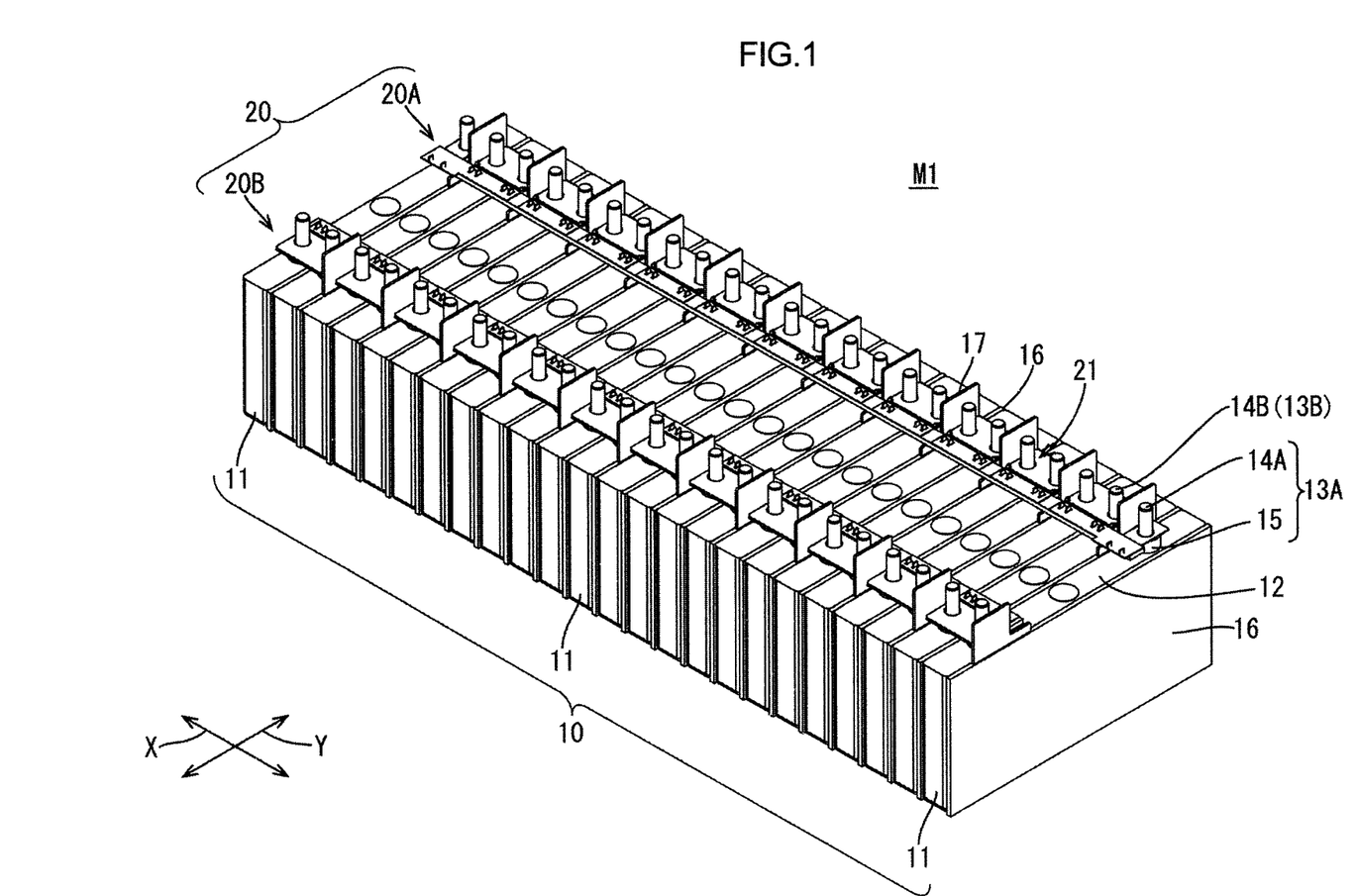
FIG. 1 is a perspective view illustrating a power storage module including a connection module according to one embodiment.

As illustrated in FIG. 1, a power storage module M1 includes a connection module 20 according to this embodiment, and a power storage element group 10 including power storage elements 11 that are arranged.

The power storage module M1 is used as a driving source of a vehicle such as an electric vehicle or a hybrid vehicle.

In the following description, a symbol is put on one of the same parts and others are not provided with the symbol and will not be described.

1. Power Storage Element Group

Figure 2:
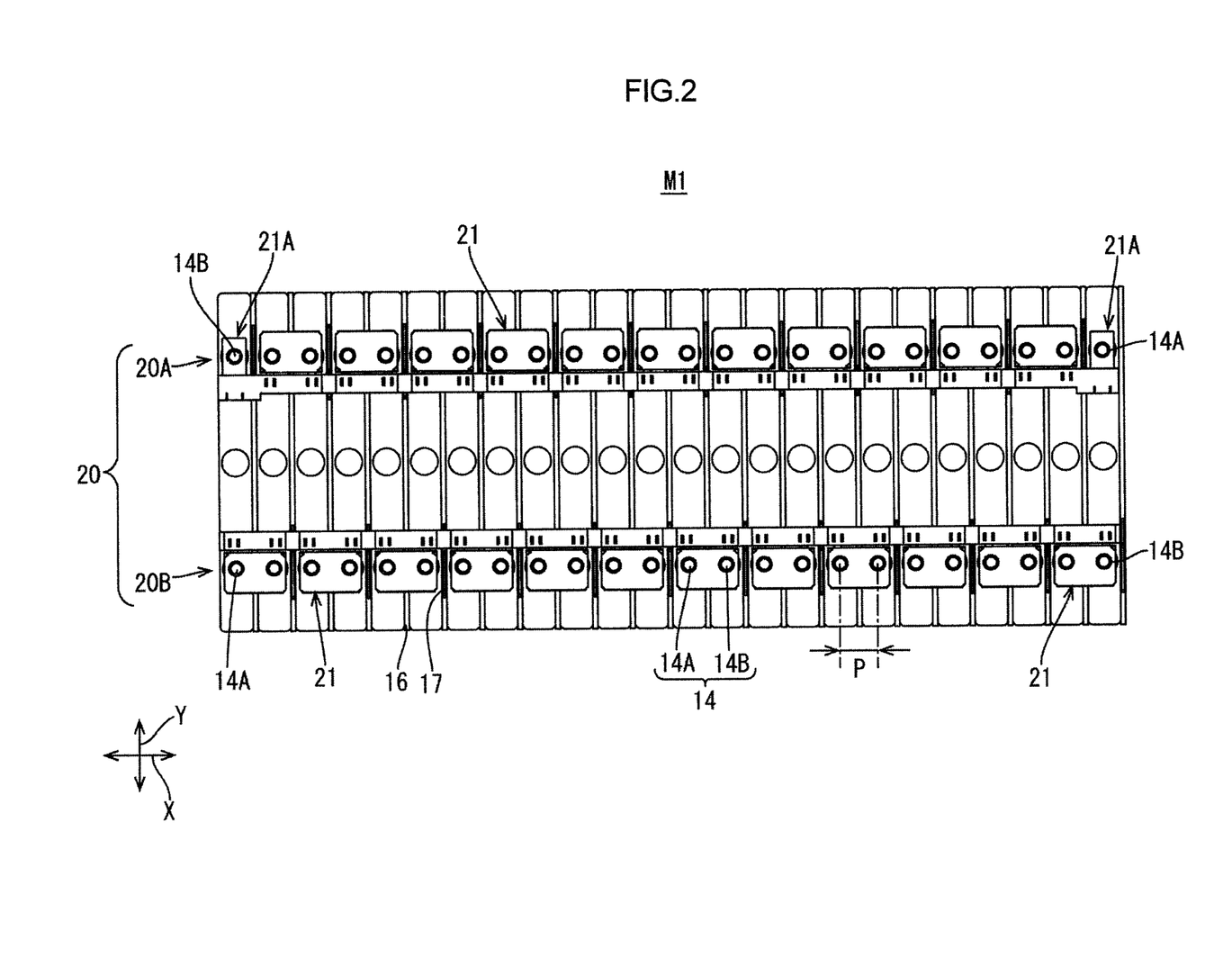
FIG. 2 is a plan view illustrating the power storage module.

As illustrated in FIGS. 1 and 2, the power storage element group 10 where a connection module 20 of this embodiment is mounted includes multiple (twenty four in this embodiment) power storage elements 11.

The power storage element 11 includes a main body 12, a positive electrode terminal 13A, and a negative electrode terminal 13B. The main body 12 has a flat rectangular parallelepiped shape and includes a power storage component, which is not illustrated, therein. The positive electrode terminal 13A and the negative electrode terminal 13B project vertically from an upper surface of the main body 12.

Each electrode terminal 13A, 13B includes a disc-shaped terminal base 15 and a cylindrical electrode terminal 14 (14A, 14B) projecting upward from the terminal base 15. Each electrode terminal 14 is inserted through a terminal insertion through hole 24 (see FIG. 3) of a bus bar 21. The electrode terminal 14 has a thread (not illustrated) on a side wall thereof and a nut (not illustrated) is to be screwed to the thread.

The bus bar 21 that is inserted in the electrode terminal 14 is contacted with the terminal base 15 such that the bus bar 21 is electrically connected to the electrode terminal 14. The power storage elements 11 are arranged such that adjacent electrode terminals 14 that are adjacent in a right-left direction in FIG. 2 (an arrow X direction) have opposite polarities.

A separator 16 is arranged between the adjacent power storage elements 11. Each separator 16 includes an insulation rib 17 that insulates the electrode terminals 14 of the adjacent power storage elements 11.

2. Connection Module

Figure 3:
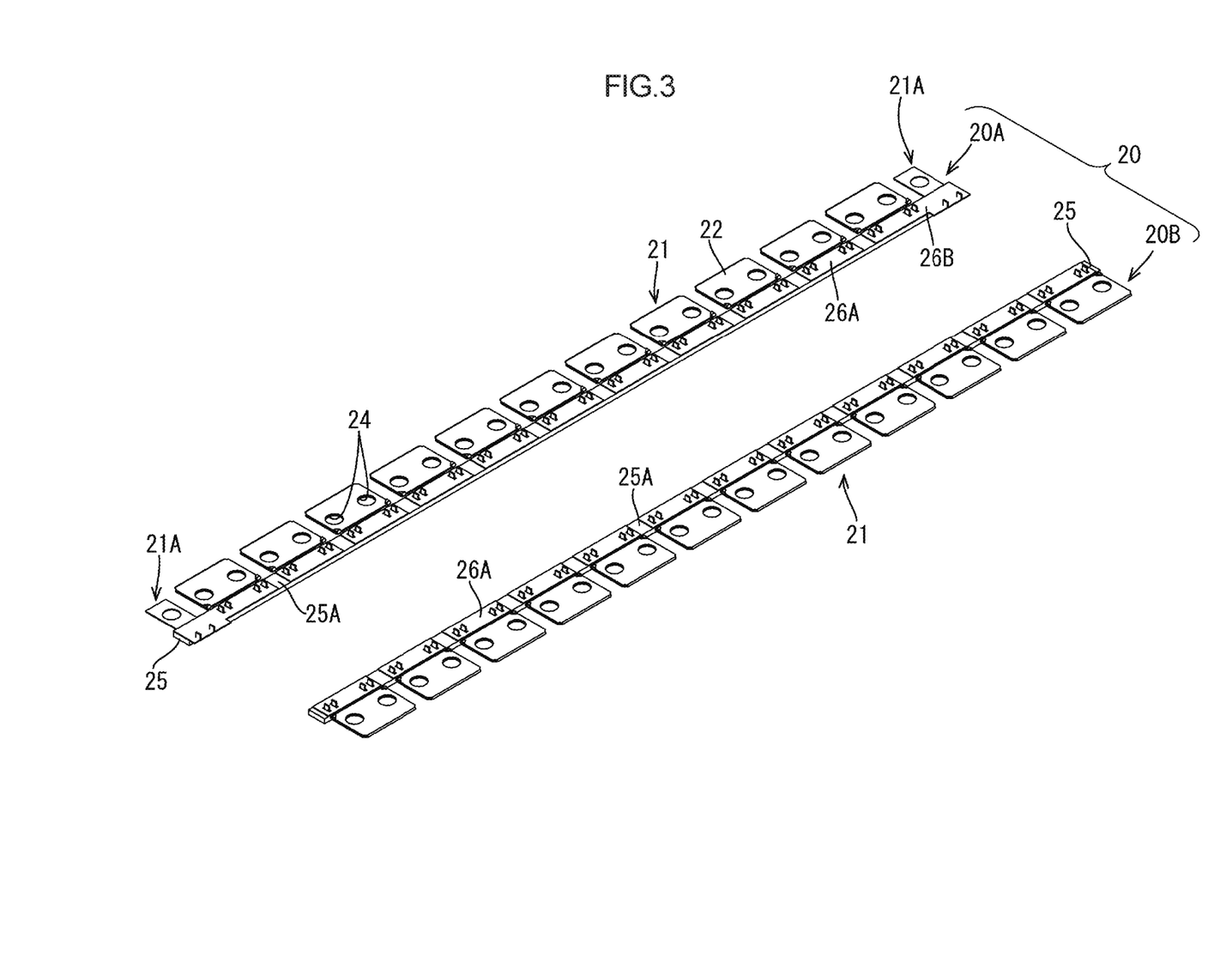
FIG. 3 is a perspective view illustrating the connection module according to the one embodiment.

As illustrated in FIGS. 1 and 2, the connection module 20 is mounted on the power storage element group 10 along an arrangement direction of the power storage elements 11 (an arrow X direction) and electrically connects the power storage elements 11. As illustrated in FIG. 3, the connection module 20 includes the bus bars 21, first sheet members 25, and second sheet members 26. As illustrated in FIG. 2, the connection module 20 includes a first connection module 20A that is mounted on an upper side portion of the power storage element group 10 and a second connection module 20B that is mounted on a lower side portion thereof.

Hereinafter, the connection modules 20A, 20B are referred to as the connection module 20 as long as it is not necessary to specify each of them.

2-1. Bus Bar

Figure 4:
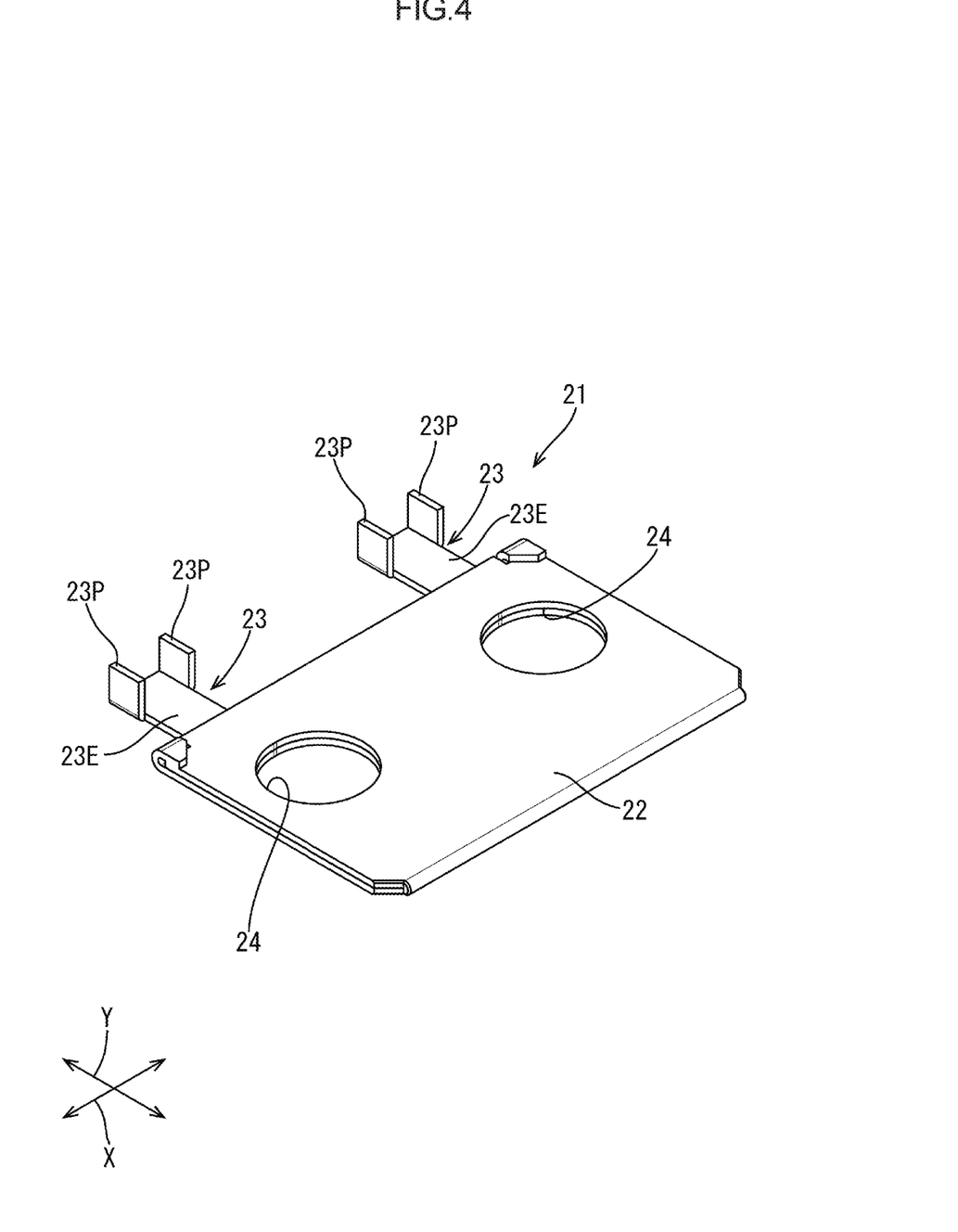
FIG. 4 is a perspective view illustrating a bus bar.
Figure 5:
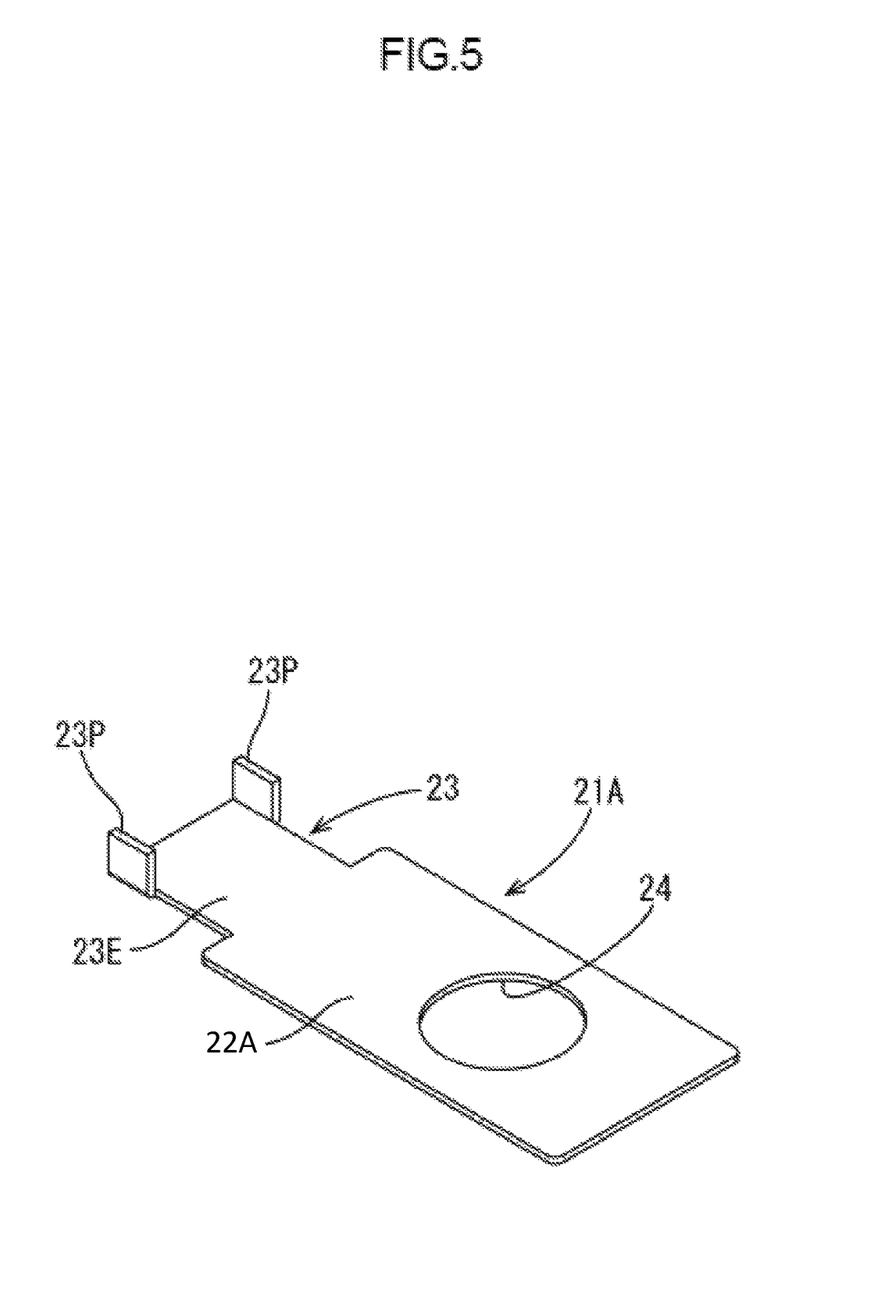
FIG. 5 is a perspective view illustrating an external connection electrode bus bar.

The bus bar 21 is made of metal such as copper, copper alloy, stainless steel (SUS), and aluminum and includes a plate member 22 that has a length dimension corresponding to a distance between the adjacent electrode terminals 14A, 14B (an electrode pitch). As illustrated in FIG. 4, each of the plate members 22 of the bus bars 21 other than external connection electrode bus bars 21A that are disposed on both ends of the first connection module 20A has a pair of terminal insertion through holes 24, 24 through which the electrode terminals 14 are inserted. As illustrated in FIG. 5, the plate member 22A of the external connection electrode bus bar 21A has only one terminal insertion through hole 24. The terminal insertion through hole 24 has an oval shape elongated in the arrangement direction of the power storage elements 11 (the arrow X direction in FIG. 1).

As illustrated in FIG. 4, the bus bar 21 includes a pair of fitting portions 23 that is fit in a fixing portion of the second sheet member 26, which will be described later. The fitting portions 23 project from one edge of the plate member 22 with respect to a width direction (an arrow Y direction in FIG. 4) thereof. Each of the fitting portions 23 includes an extended portion 23E extending from the one edge of the plate member with respect to the width direction and projections 23P formed at a distal end of the extended portion 23E. Specifically, as illustrated in FIG. 4, the extended portion 23E has a plate shape and includes the projections 23P on both side edges at the distal end thereof.

According to the bus bar 21 having the above configuration, as illustrated in FIG. 3 and other drawings, only the fitting portions 23 that project from the one edge of the plate member 22 are held by the first sheet member 25 such that a whole bus bar 21 is held by the first sheet member 25. Namely, the plate member 22 of the bus bar 21 including the terminal insertion through holes 24, 24 is not directly held by the first sheet member 25.

As illustrated in FIG. 5, the external connection electrode bus bar 21A includes the fitting portion 23 that projects from one edge of the plate member 22A and is fit in a fixing portion of the second sheet member 26, which will be described later. The fitting portion 23 includes an extended portion 23E extending from one edge of the plate member with respect to the width direction and projections 23P formed at a distal end of the extended portion 23E. The extended portion 23E has a plate shape and includes the projections 23P on both side edges at the distal end thereof. In this embodiment, the fitting portion 23 is formed integrally with the plate member 22A.

2-2. First Sheet Member

Figure 6:
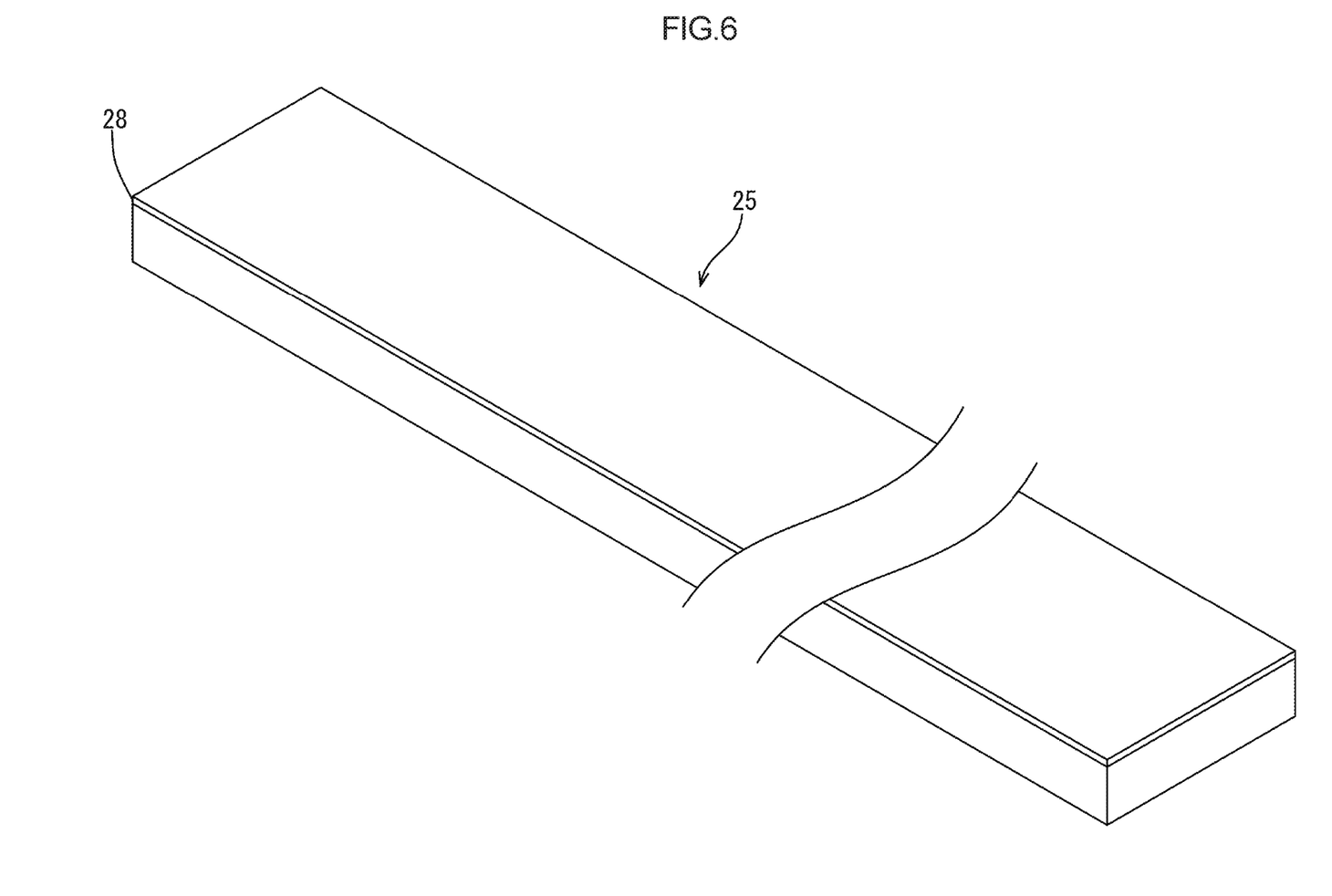
FIG. 6 is a perspective view illustrating a first sheet member.

As illustrated in FIG. 6 and other drawings, the first sheet member 25 is formed in an elongated rectangular plan view shape and holds the bus bars 21. The first sheet member 25 is expandable and includes adhesive member 28 on a surface thereof, as illustrated in FIG. 6. The adhesive member 28 is disposed on the surface of the first sheet member 25 with coating. Namely, the first sheet member 25 holds the second sheet members 26 with the adhesive member 28 while the bus bar 21 being fixed to each of the second sheet members 26. Accordingly, the first sheet member 25 commonly holds the bus bars 21. The adhesive member 28 is not necessarily disposed on an entire surface of the first sheet member 25 but may be disposed on sections of the first sheet member 25 where the second sheet members 26 are put.

Figure 8:
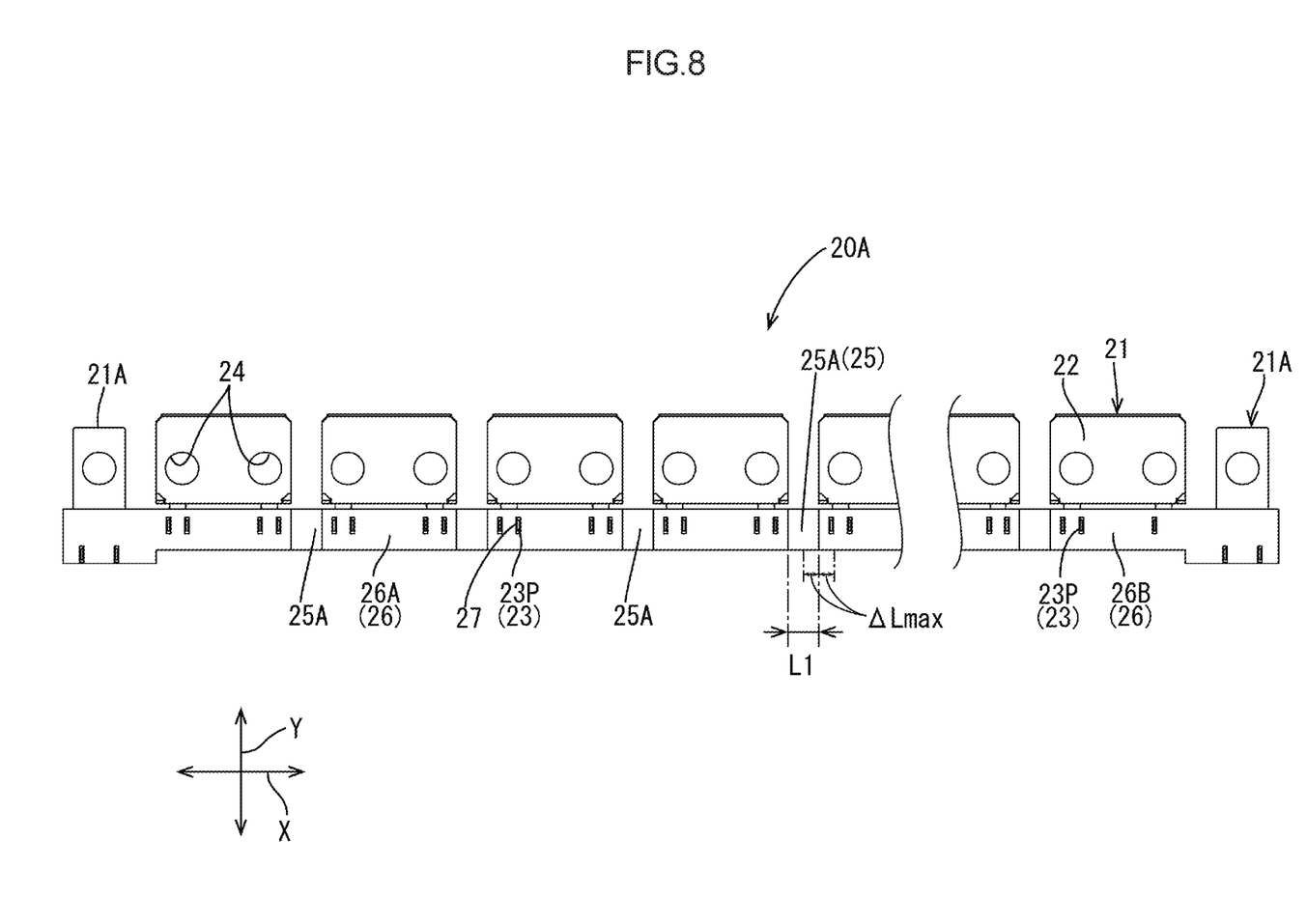
FIG. 8 is an enlarged plan view illustrating a part of the connection module.

As illustrated in FIG. 8, the first sheet member 25 is formed of a flexible insulation member that can be expanded and contracted between the adjacent second sheet members 26 in a longitudinal direction (the arrow X direction in FIG. 8) of the first sheet member. The flexible insulation member is expandable at least in a distance of a maximum value of the tolerance ΔL max that is a total value of the tolerances of the electrode pitch P (see FIG. 2) with respect to the arrangement direction of the adjacent power storage elements. The first sheet member 25 is made of foamed rubber, for example.

The first sheet member 25 includes sections L1 of first sheet member 25A that are between the adjacent second sheet members 26 and on which the second sheet members 26 are not disposed. The sections L1 of the first sheet member 25A are expandable in the distance of the maximum value of the tolerance ΔL max.

2-3. Second Sheet Member

Figure 7:
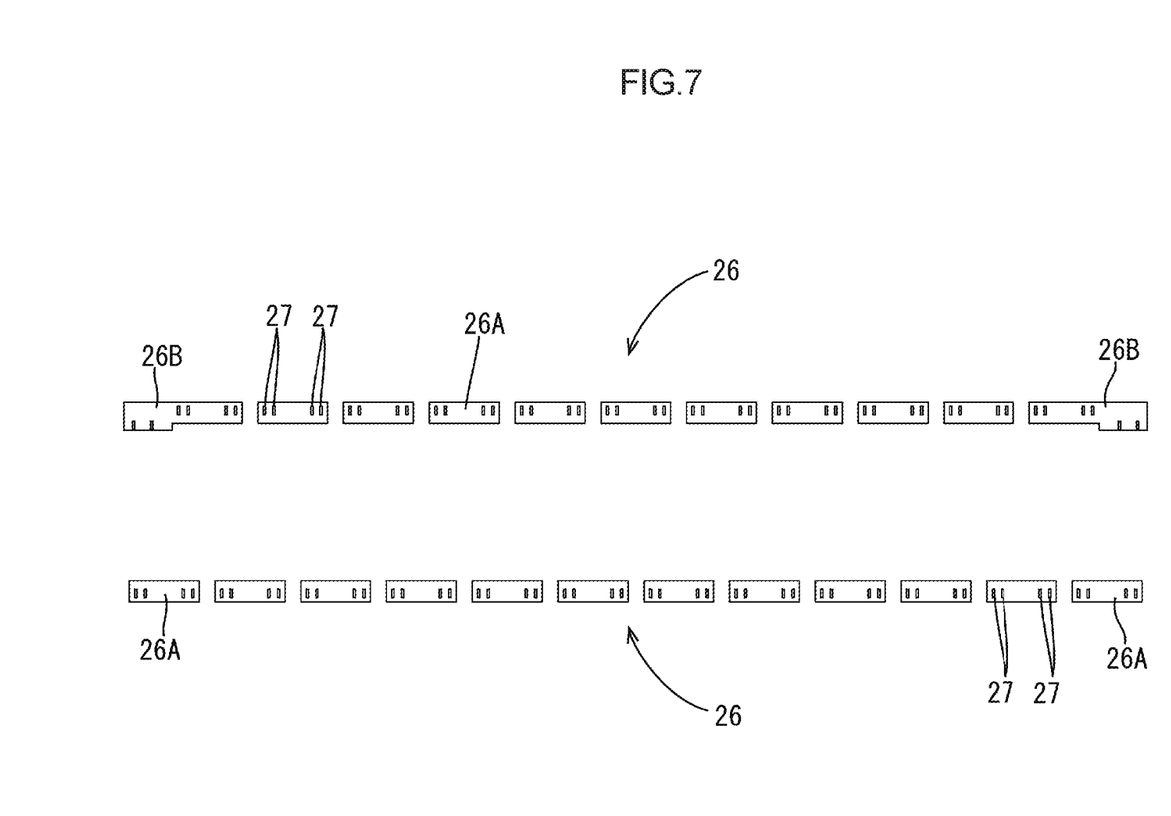
FIG. 7 is a perspective view illustrating a second sheet member.

As illustrated in FIG. 7, the second sheet member 26 is formed in substantially a rectangular plan view shape and formed of a hard insulation member without having an expandable property.

Material of the second sheet member 26 may be insulation material such as polyethylene terephthalate (PET), polystyrene (PS), polycarbonate (PC), polyamide (PA) and others. In this embodiment, the second sheet member 26 is a hard synthetic resin sheet such as polycarbonate sheet, for example. Namely, the second sheet member 26 is made of synthetic resin without having rubber elasticity. The plan view shape of the second sheet member 26 is not necessarily the one illustrated in FIG. 7.

As illustrated in FIG. 3, the second sheet members 26 are arranged on the first sheet member 25 at intervals and include the fixing portion that fixes each bus bar 21 separately. In this embodiment, the fixing portion includes through holes 27 through which the projections 23P of the bus bar 21 are inserted. Specifically, as illustrated in FIG. 7, the second sheet member 26 has the through holes 27 in positions corresponding to the projections 23P of the fitting portion 23 of the bus bar 21. In this embodiment, the second sheet member 26 has four through holes.

As illustrated in FIG. 7, the second sheet member 26 includes a second sheet member 26A that holds one bus bar 21 and a second sheet member 26B that holds one bus bar 21 and the external connection electrode bus bar 21A.

Figure 9:
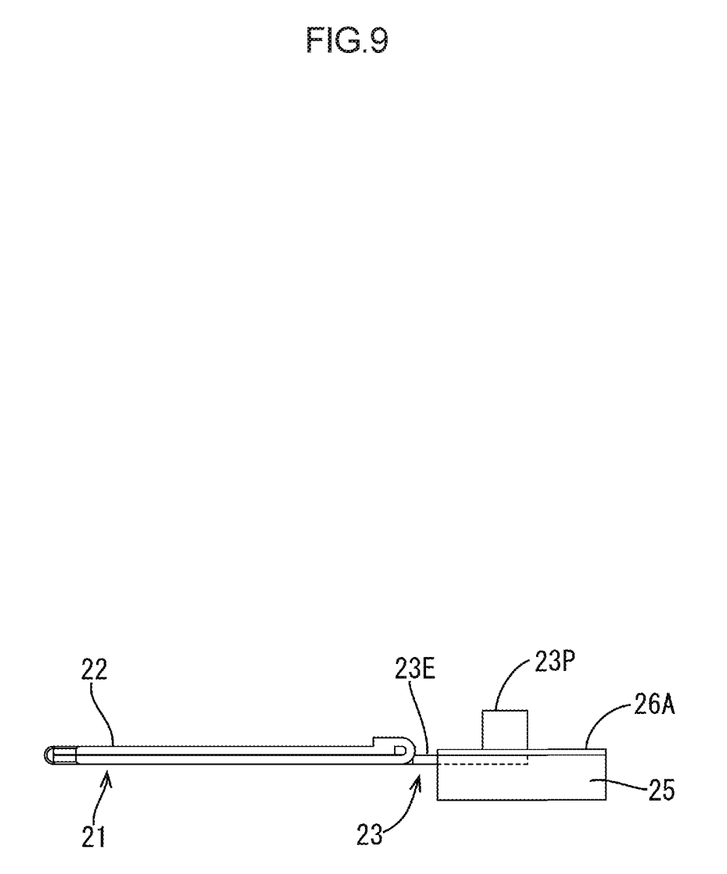
FIG. 9 is a side view illustrating the connection module.

As illustrated in FIG. 9, in the second sheet member 26 that is disposed on the first sheet member 25, the fitting portions 23 of the bus bar is fixed to the second sheet member 26 such that a section of the fitting portion 23 below the second sheet member 26, which is the extended portion 23E in this embodiment, is put into the first sheet member between the second sheet member 26 and the first sheet member 25.

3. Method of Producing Connection Module

A hard resin sheet is cut into a shape as illustrated in FIG. 7 with punching, for example, and the second sheet members 26 are produced. During the process, the through holes 27 are formed in predetermined positions.

Next, the projections 23P of each bus bar 21 are inserted through the through holes 27 of each second sheet member 26 so that each bus bar 21 is attached to each second sheet member 26. Then, the second sheet members 26 to each of which the bus bar 21 is attached are bonded to the adhesive member 28 on the first sheet member 25 with pressure at a certain interval. Accordingly, the connection module 20 as illustrated in FIG. 3 is obtained. In such a configuration according to this embodiment, each bus bar 21 is held by the first sheet member 25 so as to be movable in the distance of the maximum value of the tolerance ΔL max in the arrow X direction in FIG. 8 according to expansion and contraction of the first sheet members 25A between the adjacent second sheet members 26 in the longitudinal direction (the arrow X direction in FIG. 8) of the first sheet member 25.

4. Method of Mounting Connection Module

Next, a method of mounting the connection module 20 on the power storage element group 10 will be described. The power storage elements 11 are arranged such that the adjacent electrode terminals 14 have opposite polarities. Then, the separators 16 having the insulation ribs 17 and the power storage elements 11 are alternately arranged while sandwiching the power storage element 11 therebetween.

Next, the connection module 20 is disposed on a surface having the electrode terminals 14. The connection module 20 is mounted on the power storage element group and each electrode terminal 14 of the power storage element group 10 is inserted through the terminal insertion through hole 24 of each bus bar 21. Thus, the power storage module M1 illustrated in FIG. 1 is obtained. In the connection module 20 of this embodiment, each bus bar 21 is held by the first sheet member 25 so as to be movable in the distance of the maximum value of the tolerance ΔL max.

5. Advantageous Effects of this Embodiment

The second sheet members 26 that fix and hold the bus bars 21 are disposed on the first sheet member 25 and the first sheet member 25 is formed of a flexible insulation member so as to be expandable in the sections thereof between the adjacent second sheet members 26 in the longitudinal direction of the first sheet member 25 (the arrow X direction in FIG. 8) and the flexible insulation member is expandable at least in the distance of the maximum value of the tolerance ΔL max that is the total value of the tolerances of the electrode pitch P with respect to the arrangement direction of the adjacent power storage elements 11 (the arrow X direction in FIG. 2). Therefore, the connection module 20 can be mounted on the power storage element group 10 while following the electrode pitch tolerance of the power storage electrode group, and the mounting operation can be easy.

The fitting portions 23 of the bus bar project from one edge of the plate member 22 with respect to the width direction (the arrow Y-direction in FIG. 4) and are fit in the through holes (the fixing portion) 27 of the second sheet member. Namely, the plate member 22 of the bus bar 21 having the terminal through holes 24, 24 is not directly held by the first sheet member 25. In other words, the first sheet member 25 is not present below the plate member 22 of the bus bar 21.

According to such a configuration, the electrode terminal (bolt) 14 of the power storage element is not tightened with a nut by the first sheet member 25. Therefore, reliability of mounting of the connection module 20 on the power storage element group 10 can be maintained. If the connection module 20 is expanded corresponding to the power storage elements 11, the first sheet member 25 is less likely to be deformed and less likely to be shifted in a rotating direction. Therefore, the connection module 20 can be positioned according to the tolerance of the electrode pitch P when mounted on the power storage element group 10.

Namely, according to this embodiment, the connection module 20 can be mounted while following the tolerance of the electrode pitch P in the arrangement direction of the power storage elements 11 of the power storage element group 10 with a simple structure. Furthermore, the reliability of mounting the connection module 20 on the power storage element group 10 can be maintained.

The fitting portion 23 of the bus bar includes the extended portion 23E extending from the one edge of the plate member 22 with respect to the width direction and the projections 23P formed at the distal end of the extended portion 23E. The fixing portion of the second sheet member 26 is through holes 27 through which the projections 23P are inserted. Therefore, the bus bar 21 can be surely fixed to the second sheet member 26 with a simple structure.

The plate member includes two fitting portions 23 at two ends of the one edge of the plate member with respect to the width direction thereof (the arrow Y direction in FIG. 4). The extended portion 23E has a plate shape and includes the projections 23P at the two side edges of the distal end. The second sheet member 26 includes the fixing portion at the positions corresponding to the fitting portions 23 and each fixing portion includes two through holes 27. Namely, the bus bar 21 is fixed to the second sheet member 26 with four projections 23P. Therefore, the bus bar can be fixed to the second sheet member further surely with a simple structure.

As illustrated in FIG. 9, the second sheet member 26 is disposed on the first sheet member 25 such that the section of the fitting portions 23 below the second sheet member 26, which is the extended portion 23E, is put into the first sheet member. Therefore, a contact area of the lower surface of the second sheet member 26 and the adhesive member 28 on the surface of the first sheet member 25 is large and the bonding force of the second sheet member 26 to the first sheet member 25 is increased. Accordingly, the reliability of the first sheet member 25 that holds the bus bar is increased.

Other Embodiments

The present technology described in this specification is not limited to the embodiment, which has been described using the foregoing descriptions and the drawings. For example, embodiments described below are also included in the technical scope of the present technology described in this specification.

(1) In the above embodiment, as illustrated in FIG. 4, the fitting portions 23 are provided at two end positions of the one edge of the plate member with respect to the width direction thereof and the extended portion 23E has a plate shape and includes the projections 23P at the both side edges at the distal end thereof. However, it is not limited thereto. For example, one fitting portion 23 may be provided at a middle of the one edge of the plate member with respect to the width direction thereof.

The extended portion 23E may include one projection 23P. Furthermore, the shape of the projection 23P may not be necessarily a thin plate shape illustrated in FIG. 4. The projection 23P may have a columnar shape.

Furthermore, the plate member 22 of the bus bar 21 may not include the terminal insertion through holes 24, 24.

(2) In the above embodiment, the fixing portion of the second sheet member 26 is the through holes 27. However, it is not limited thereto. The fixing portion may be configured according to a configuration of the fitting portion 23 of the bus bar 21.

(3) In the above embodiment, as illustrated in FIG. 9, the second sheet member 26 is disposed on the first sheet member 25 while the extended portion 23E of the fitting portion 23 of the bus bar 21 being put into the first sheet member. However, it is not limited thereto. The extended portion 23E is not necessarily put into the first sheet member when the second sheet member 26 is disposed on the first sheet member 25.

EXPLANATION OF SYMBOLS

10: power storage element group
11: power storage element
14: electrode terminal
20A: first connection module (connection module)
20B: second connection module (connection module)
21: bus bar
22: plate member
23: fitting portion
23E: extended portion
23P: projection
25: first sheet member
26: second sheet member
27: through hole (fixing portion)
28: adhesive member
M1: power storage module A connection module described in this specification is to be mounted on a power storage element group including power storage elements having a positive electrode terminal and a negative electrode terminal. The connection module includes bus bars each including a plate member that connects the positive electrode terminal and the negative electrode terminal of adjacent power storage elements among the power storage elements, a first sheet member that is expandable and includes an adhesive member on a surface thereof, and second sheet members disposed on the first sheet member at intervals and formed of a hard insulation member that is not expandable, each of the second sheet members having a fixing portion that fixes each of the bus bars independently. Each of the bus bars includes a fitting portion that extends from one edge of the plate member with respect to a width direction thereof and fits in the fixing portion of each second sheet member. The first sheet member holds each of the second sheet members with the adhesive member, and each of the bus bars is fixed to each second sheet member and accordingly, the first sheet member commonly holds the bus bars. The first sheet member is formed of a flexible insulation member such that the flexible insulation member is expandable at sections between adjacent second sheet members in a longitudinal direction of the first sheet member, and the flexible insulation member is expandable at least in a distance of a maximum value of tolerance that is a total value of tolerances of an electrode pitch with respect to an arrangement direction in which the adjacent power storage elements are arranged.

According to such a configuration, the second sheet members that fix and hold the bus bars are disposed on the first sheet member and the first sheet member is formed of a flexible insulation member so as to be expandable in the sections thereof between the adjacent second sheet members in the longitudinal direction of the first sheet member and the flexible insulation member is expandable at least in the distance of the maximum value of the tolerance that is the total value of the tolerances of the electrode pitch with respect to the arrangement direction of the adjacent power storage elements. Therefore, the connection module can be mounted on the power storage element group while following the electrode pitch tolerance of the power storage electrode group and the mounting operation can be easy.

The fitting portions of the bus bar project from one edge of the plate member with respect to the width direction thereof and are fit in the fixing portion of the second sheet member. Therefore, the electrode (bolt) of the power storage element is not tightened with a nut by the sheet member in mounting the connection module on the power storage element group. Thus, reliability of mounting of the connection module on the power storage element group can be maintained. Namely, according to this configuration, the connection module can be mounted while following the tolerance of the electrode pitch in the arrangement direction of the power storage elements of the power storage element group with a simple structure.

In the connection module, the fitting portion of the bus bar may include an extended portion extending from the one edge of the plate member with respect to the width direction thereof and a projection formed at a distal end of the extended portion, and the fixing portion of the second sheet member may include a through hole through which the projection of the bus bar is inserted.

According to such a configuration, the bus bar can be fixed to the second sheet member surely with a simple structure.

In the connection module, the fitting portion may be included at two portions of the one edge of the plate member with respect to the width direction thereof, the extended portion may have a plate shape and include the projections at two side edges of the distal end thereof, and the second sheet member may have the fixing portion at a position corresponding to the fitting portion and each fixing portion may include two through holes.

According to such a configuration, the bus bar can be fixed to the second sheet member further surely with a simple structure.

In the connection module, the second sheet member may be disposed on the first sheet member such that a section of the fitting portion of the bus bar that is below the second sheet member is put into the first sheet member between the second sheet member and the first sheet member.

According to such a configuration, the second sheet member is disposed on the first sheet member such that the section of the fitting portion below the second sheet member is put into the first sheet member. Therefore, a contact area of the lower surface of the second sheet member and the adhesive member on the surface of the first sheet member is large and the bonding force of the second sheet member to the first sheet member is increased. Accordingly, the reliability of the first sheet member that holds the bus bar is increased.

The invention claimed is:

1. A connection module that is to be mounted on a power storage element group including power storage elements having a positive electrode terminal and a negative electrode terminal, the connection module comprising:
   bus bars each including a plate member that connects the positive electrode terminal and the negative electrode terminal of adjacent power storage elements among the power storage elements;
   a first sheet member that is expandable and includes an adhesive member on a surface thereof; and
   second sheet members disposed on the first sheet member at intervals and formed of a hard insulation member that is not expandable, each of the second sheet members having a fixing portion that fixes each of the bus bars independently, wherein
   each of the bus bars includes a fitting portion that extends from one edge of the plate member with respect to a width direction thereof and fits in the fixing portion of each second sheet member,
   the first sheet member holds each of the second sheet members with the adhesive member, each of the bus bars is fixed to each second sheet member, and whereby the first sheet member commonly holds the bus bars, and
   the first sheet member is formed of a flexible insulation member such that the flexible insulation member is expandable at sections between adjacent second sheet members in a longitudinal direction of the first sheet member, and the flexible insulation member is expandable at least in a distance of a maximum value of tolerance that is a total value of tolerances of an electrode pitch with respect to an arrangement direction in which the adjacent power storage elements are arranged.

2. The connection module according to claim 1, wherein the fitting portion of the bus bar includes an extended portion extending from the one edge of the plate member with respect to the width direction thereof and a projection formed at a distal end of the extended portion, and
the fixing portion of the second sheet member includes a through hole through which the projection of the bus bar is inserted.

3. The connection module according to claim 2, wherein the fitting portion is included at two portions of the one edge of the plate member with respect to the width direction thereof,
the extended portion has a plate shape and includes the projections at two side edges of the distal end thereof, and
the second sheet member has the fixing portion at a position corresponding to the fitting portion and each fixing portion includes two through holes.

4. The connection module according to claim 3, wherein the second sheet member is disposed on the first sheet member such that a section of the fitting portion of the bus bar that is below the second sheet member is put into the first sheet member between the second sheet member and the first sheet member.

5. The connection module according to claim 1, wherein the second sheet member is disposed on the first sheet member such that a section of the fitting portion of the bus bar that is below the second sheet member is put into the first sheet member between the second sheet member and the first sheet member.

6. The connection module according to claim 1, wherein the second sheet members are placed on the adhesive member.

7. The connection module according to claim 1, wherein the second sheet members are arranged on the first sheet member at intervals along the longitudinal direction of the first sheet.

* * * * *